United States Patent [19]

Horchler, Jr.

[11] Patent Number: 5,603,206

[45] Date of Patent: Feb. 18, 1997

[54] ROUND BALER PICKUP SHAFT BEARING PROTECTION APPARATUS

[75] Inventor: Fred M. Horchler, Jr., Lancaster, Pa.

[73] Assignee: New Holland North America, Inc., New Holland, Pa.

[21] Appl. No.: 489,667

[22] Filed: Jun. 12, 1995

[51] Int. Cl.$^6$ .................................................. A01F 15/07
[52] U.S. Cl. ............................................ 56/341; 100/88
[58] Field of Search .............................. 56/341; 100/88, 100/89

[56] References Cited

U.S. PATENT DOCUMENTS

| | | | |
|---|---|---|---|
| 1,351,481 | 8/1920 | Lister | 384/546 |
| 2,355,805 | 8/1944 | Koepp | 384/484 |
| 2,827,344 | 3/1958 | Maag | 384/484 |
| 2,873,153 | 2/1959 | Haynie | 384/484 |
| 3,791,287 | 2/1974 | Molitorisz | 100/89 |
| 3,974,632 | 8/1976 | Van Der Lely | 56/341 |
| 4,198,804 | 4/1980 | Konekamp | 100/89 X |
| 4,336,750 | 6/1982 | White et al. | 56/341 X |
| 4,409,783 | 10/1983 | Gaeddert | 56/341 |
| 4,581,879 | 4/1986 | Anstey | 100/88 X |
| 4,638,623 | 1/1987 | Schaible et al. | 56/341 |
| 5,044,272 | 9/1991 | Jennings | 100/89 |
| 5,193,450 | 3/1993 | Anderson | 100/88 |
| 5,333,516 | 8/1994 | Edwards et al. | 56/341 X |
| 5,347,801 | 9/1994 | McIlwain | 56/341 |
| 5,408,801 | 4/1995 | McClure et al. | 100/88 |
| 5,448,944 | 9/1995 | Line et al. | 100/88 |

*Primary Examiner*—Terry Lee Melius
*Assistant Examiner*—Thomas A. Beach
*Attorney, Agent, or Firm*—Frank A. Seemar; Larry W. Miller; John W. Stader

[57] ABSTRACT

A round baler having a frame, a baling chamber for forming cylindrical packages of crop material mounted on the frame, a pickup for feeding crop material into the chamber including a tubular rotatable shaft extending transverse of the frame and concentric with a stationary shaft also extending transverse of the frame. The tubular shaft is journalled via a bearing assembly including a generally cylindrical stationary first race and a concentrically disposed generally cylindrical rotatable second race between which races a bearing cavity is formed for seating a series of bearings housed between the first and second races. The first race is affixed to the stationary shaft and the second race is rotatable relative to the first race and affixed to the tubular shaft for rotating in concert therewith relative to the first race. An annular shaped cover encloses the cavity and has a first edge adjacent the stationary shaft. A holding collar is fixedly disposed between the inner race and the annular cover, which annular cover has an integral cylindrical portion contiguous with the rotatable tubular shaft. A generally ring shaped sleeve extends adjacent to the outer surface of the integral cylindrical portion to maintain integrity of the bearing cavity against unwanted debris.

4 Claims, 1 Drawing Sheet

ROUND BALER PICKUP SHAFT BEARING PROTECTION APPARATUS

FIELD OF THE INVENTION

This invention relates generally to a baler for forming cylindrical bales of crop material, commonly referred to as a round baler. More particularly, this invention is directed to improved bearing protection apparatus for a shaft in the baler pickup assembly.

BACKGROUND OF THE INVENTION

Prior art balers of this type generally have a bale forming chamber defined by an apron comprising an array of side-by-side belts, transverse slats extending between chains, a plurality of bale forming rolls or a combination of these various elements, e.g., bale forming rolls and side-by-side belts. The utilization of rolls in combination with belts is shown by way of example in the round baler of U.S. Pat. No. 5,044,272 issued Sep. 3, 1991 to Richard E. Jennings.

During field operation, a pickup assembly picks up crop material, such as hay, from the ground and feeds it into a fixed or adjustable chamber where it is rolled up to form a compact cylindrical package of hay. While still inside the bale forming chamber the formed package is wrapped in its compacted form by net, twine or the like, prior to being ejected as a bale from the baler onto the ground for subsequent handling.

Round balers of the various configurations mentioned above commonly have a pickup that feeds crop material along a path by means of tines that engage a windrow of crop material on the ground. Other feed assist means such as fingers may be used along the path to urge the material along. Pickup assemblies have encountered problems of varying degree caused by stray crop material and other debris, such as dirt, crop juices and dust, in the bearing assemblies for the rotatable transverse shafts. When the crop material being baled is damp, and particularly if it is a short cut of grass crop, the fine random debris being agitated as it is being picked up and formed into a cylindrical package also gives cause for concern. Field experience has shown that costly bearing seals are necessary to prevent such unwanted debris from working its way into the pickup assembly bearing cavities. If permitted to go uncorrected, serious wear problems could occur culminating in bearing failure.

A known attempt in the prior art to reduce or overcome this problem has been successful but costly. This arrangement, shown in FIG. 1 of the drawings, is described in detail hereinbelow.

In any attempted solution, maintaining the integrity of the bearing cavity for long and continuous use in the field environment described above is a key design criteria. As mentioned above, if debris is permitted to enter the bearing cavity it will cause an unwanted affect on operation of the bearing assembly and ultimate failure of the pickup, resulting in machine downtime.

Although known prior art arrangements for preventing debris from entering the bearing cavity of shaft mounting assemblies have met with varying degrees of success, the root of the problem continues to be derived from the environment in which the invention is used unwanted debris continually exists, especially during long periods of operation of the pickup. When this debris works past the known shielding devices and ultimately penetrates the bearing seal it will cause bearing failure if uncorrected. Thus, integrity of the debris shield over long periods of use is an important aspect of reliable round baler performance to which the present invention is devoted.

SUMMARY OF THE INVENTION

The most important object of the present invention is to provide a low cost bearing assembly for use on a pickup feeder shaft for a round baler without affecting the reliability and thereby maintain overall performance characteristics by avoiding failure caused by the entry of unwanted debris into the bearing cavity.

In pursuance of this and other important objects the present invention provides for new and unique round baler apparatus having a frame, a baling chamber for forming cylindrical packages of crop material mounted on the frame, means for feeding crop material into the chamber including a tubular rotatable shaft extending transverse of the frame and concentric with a stationary shaft also extending transverse of the frame, and journal means having a bearing assembly for mounting said tubular shaft, the bearing assembly includes a generally cylindrical stationary first race and a concentrically disposed generally cylindrical rotatable second race between which races a bearing cavity is formed for seating a series of bearings housed between the first and second races. The first race is affixed to the stationary shaft and the second race is rotatable relative to the first race and affixed to the tubular shaft for rotating in concert therewith relative to the first race. More particularly, the present invention contemplates an improvement providing an annular shaped cover enclosing the cavity with a first edge adjacent the stationary shaft. Holding means are also provided for preventing the bearing assembly from shifting axially. The holding means is fixedly disposed between the inner race and the annular cover. Still further, the annular cover has an integral cylindrical portion contiguous with the rotatable tubular shaft and a generally ring shaped sleeve extends adjacent to the outer surface of the integral cylindrical portion to maintain integrity of the bearing cavity against unwanted debris by being spaced a sufficient distance to permit relative friction free motion therebetween.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
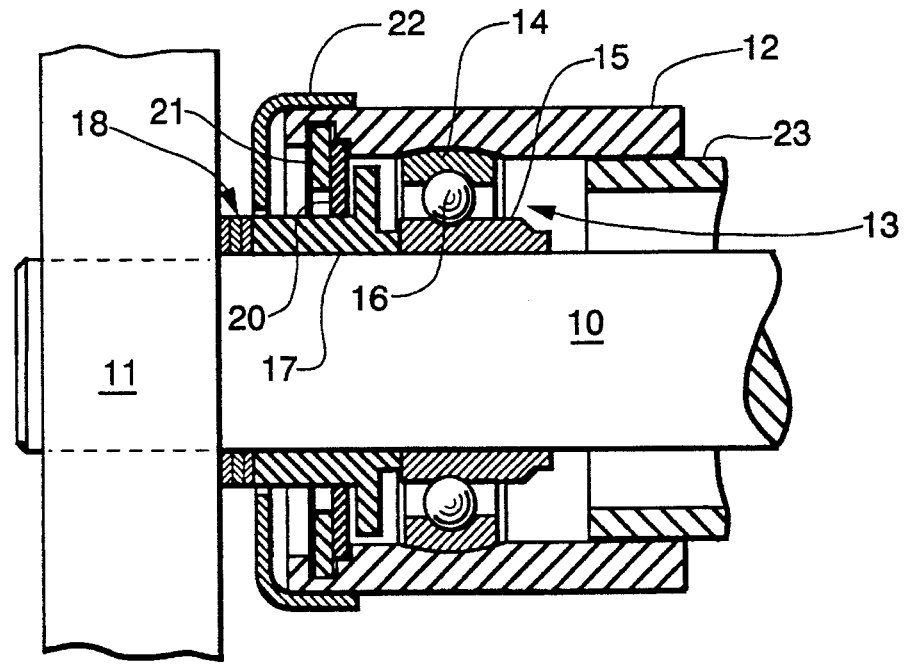
FIG. 1 is a cross sectional side elevation view of prior art shaft bearing protection apparatus.

Referring now to the drawings for a more detailed description of the preferred embodiment of the invention, FIG. 1 shows a prior art shaft bearing protection arrangement used in the pickup assemblies of round balers. A typical example of a round baler having a pickup for crop material is disclosed in detail in U.S. Pat. No. 5,044,272 issued on Sep. 3, 1991 in the name of R. E. Jennings, hereby incorporated by reference.

For the purpose of the present invention, it should be understood that as round balers of the type disclosed in the above referenced patent are towed across a field by a tractor, pickup tines in a pickup assembly lift crop material from the ground and feed it into a bale forming chamber in a conventional manner. The crop material is conveyed in the chamber by a series of inwardly facing moving surfaces such as belts or rollers where it is coiled or randomly accumulated to form a cylindrical package of crop material. During such formation, continued feeding of crop material into the chamber is provided by a pickup assembly, the tines of which rotate to continuously engage the crop material. When a full sized package has been formed, the crop material is wrapped with a suitable material, such as twine or net, and ejected onto the field, at which time the baler is again ready to form another bale.

Now turning to the protection apparatus of the present invention, it will be understood in light of the prior art and the above description that during formation of a bale the hay is agitated and churned. In some instances, especially in certain crop types and conditions, crop fines have a tendency to accumulate in excessive amounts in the pickup area below the throat of the chamber. To this end, the improved apparatus in which the present invention is embodied, shown in FIG. 2, is operative to prevent or significantly reduce the amount of debris that enter the bearing cavity from this dusty and particle laden environment.

More specifically, FIG. 1 shows a shaft bearing protection arrangement comprising a fixed shaft 10 mounted in mounting plate 11, about which shaft a tubular shaft 12 is rotatably mounted by means of bearing assembly 13, consisting of outer race 14, inner race 15, and a series of ball bearings 16. Shaft 10, which is machined over its entire length has inner race 15 and hat shaped collar 17 affixed thereto, both of which are held in axial relationship with mounting plate 11 by a series of spacers 18. Tubular shaft 12 receives outer race 14 in a machined indentation on its inner surface. Sealing washer 20 and holding washer 21 are held in place by a machined dual level slot in the outer end of the inner surface of tubular shaft 12. Completing the assembly is a seal cover 22 which is force fit on the outer surface of the end of tubular shaft 12. Also shown is cylindrical shaft element 23 secured to the inner surface of tubular shaft 12 and rotatable therewith for the mounting of tines or the like to engage crop material under conditions where the tubular shaft assembly rotates about fixed shaft 10.

Figure 2:
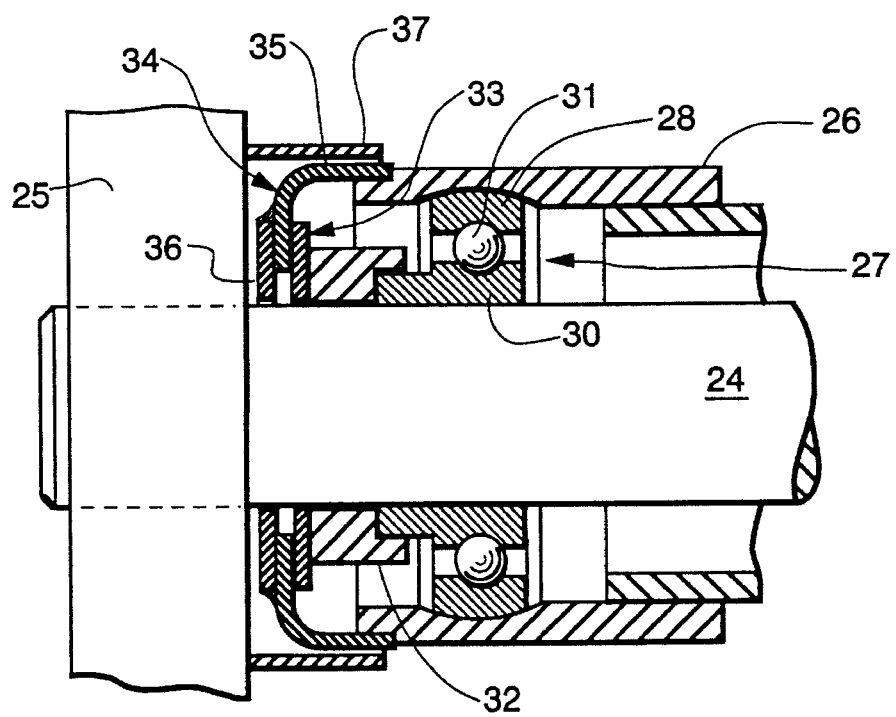
FIG. 2 is a cross sectional side elevation of the shaft bearing protection apparatus of the present invention.

In FIG. 2, a simple and effective shaft bearing protective arrangement is depicted which functions to protect a bearing cavity via the implementation of a unique low cost assembly. A fixed shaft 24 is mounted on mounting plate 25, about which shaft a tubular shaft 26 is rotatably mounted by means of bearing assembly 27, consisting of outer race 28, inner race 30, and a series of ball bearings 31. These elements function in a manner similar to their counterparts in FIG. 1, i.e., tubular shaft 26 is rotatably mounted to rotate about concentric fixed shaft 24 fixedly mounted in mounting plate 25. The improved bearing protection apparatus of the present invention comprises conventional locking collar 32 which holds inner race 30 in place without requiring a finely machined shaft surface with dimension accurately sized to receive the race, as in the case of the FIG. 1 prior art arrangement. The apparatus further comprises a resilient sealing washer 33 held in place by a seal cover 34 which includes an integral cylindrical flange portion 35 affixed to the end portion of the outer surface of tubular shaft 26. Seal cover 34 also includes an integral ring portion 36 that is in close proximity to the outer surface of fixed shaft 24. Completing the apparatus is a cylindrically shaped sleeve 37 affixed to and extending from the inner surface of mounting plate 25. Sleeve 37 is in close proximity to flange portion 35 to discourage the entry of large particles of debris but at sufficient spacial relationship to avoid engagement with tubular shaft 26 and seal cover 34 under conditions where they rotate in concert about fixed shaft 24.

In operation, integrity of the bearing cavity is maintained by seal cover 34 which is maintained snugly against washer 33 to prevent intrusion of unwanted debris that accumulates in the area of bearing assembly 27 during operation of the pickup. Also contributing to the protective function is sleeve 37 which interrupts the radial path of debris in the general vicinity of the shaft bearing cavity being protected. Sleeve 37 is spaced a sufficient distance to permit relative friction free motion between its inner surface and the opposing surface of integral cylindrical portion 35.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention. For example, although the preferred embodiment of the invention is referred to as being adapted for use in a round baler environment in which the chamber is defined by a series of belts and rolls, it is contemplated that any type of round baler, regardless of chamber defining means, whether an expandable or non-expandable chamber, could be improved by the principles of this invention.

Having thus described the invention, what is claimed is:
1. In a round baler having
a frame,
a baling chamber for forming cylindrical packages of crop material mounted on said frame,
means for feeding crop material into the chamber including a tubular rotatable shaft extending transverse of said frame and concentric with a stationary shaft also extending transverse of said frame, and
journal means having a bearing assembly for mounting said tubular shaft, said bearing assembly includes a generally cylindrical stationary first race and a concentrically disposed generally cylindrical rotatable second race between which races a bearing cavity is formed for seating a series of bearings housed between said first and second races, said first race affixed to said stationary shaft, said second race being rotatable relative to said first race and affixed to said tubular shaft for rotating in concert therewith relative to said first race, the improvement comprising
an annular shaped cover enclosing said cavity and having a first edge adjacent said stationary shaft,
holding means for preventing said bearing assembly from shifting axially, said holding means comprising a lock- ing collar affixed to said stationary shaft between said inner race and said first edge of said annular cover, said annular cover having an integral cylindrical portion continuous with said rotatable tubular shaft, and a generally ring shaped sleeve extending adjacent to the outer surface of said integral cylindrical portion to maintain integrity of the bearing cavity against unwanted debris by being spaced a sufficient distance to permit relative friction free motion therebetween.

2. In a round baler as set forth in claim 1 wherein said improvement further comprises resilient means disposed coaxial with said stationary shaft between and in cooperative engagement with said locking collar and said annular shaped cover.

3. In a round baler as set forth in claim 1 wherein said round baler further comprises opposing fixed walls between which said stationary shaft extends, and wherein said generally ring shaped sleeve is affixed to at least one of said walls.

4. In a round baler as set forth in claim 3 wherein said improvement further comprises resilient means disposed coaxial with said stationary shaft between and in cooperative engagement with said locking collar and said annular shaped cover.

* * * * *